(12) United States Patent
Arimilli et al.

(10) Patent No.: US 8,775,778 B2
(45) Date of Patent: Jul. 8, 2014

(54) USE OF A HELPER THREAD TO ASYNCHRONOUSLY COMPUTE INCOMING DATA

(75) Inventors: Ravi K. Arimilli, Austin, TX (US); Juan C. Rubio, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1523 days.

(21) Appl. No.: 12/024,228

(22) Filed: Feb. 1, 2008

(65) Prior Publication Data
US 2009/0199181 A1  Aug. 6, 2009

(51) Int. Cl.
*G06F 9/30* (2006.01)

(52) U.S. Cl.
USPC .......................................... 712/220

(58) Field of Classification Search
CPC ............................... G06F 9/3842; G06F 9/383
USPC .......................................... 712/220
See application file for complete search history.

(56) References Cited

U.S. PATENT DOCUMENTS

| 2003/0233394 A1 | 12/2003 | Rudd et al. |
| 2004/0054990 A1 | 3/2004 | Liao et al. |
| 2004/0154011 A1 | 8/2004 | Wang et al. |
| 2004/0216102 A1 | 10/2004 | Floyd |
| 2005/0071841 A1 | 3/2005 | Hoflehner et al. |
| 2005/0223199 A1* | 10/2005 | Grochowski et al. ......... 712/235 |
| 2005/0278487 A1 | 12/2005 | Blandy |
| 2006/0155963 A1 | 7/2006 | Bohrer et al. |
| 2007/0022422 A1 | 1/2007 | Tirumalai et al. |
| 2007/0088915 A1 | 4/2007 | Archambault et al. |
| 2007/0226465 A1 | 9/2007 | Chaudhry et al. |

OTHER PUBLICATIONS

Tanenbaum, Andrew. "Structured Computer Organization". Prentice-Hall, Inc. pp. 10-12, 1984.*
Cprogramming.com: "Compiling and Linking". 2 pages, 2005.*
Aamodt, T. et al, "A Framework for Modeling and Optimization of Prescient Instruction Prefetch," SIGMETRICS'03, Jun. 10-14, 2003, San Diego, California, USA, pp. 13-24.
Wang, P. et al, "Helper Threads VIA Virtual Multithreading on an Experimental Itanium 2 Processor-Based Platform," ASPLOS'04, Oct. 9-13, 2004, Boston, Massachusetts, USA, pp. 144-155.
Aamodt, T. et al, "Optimization of Data Prefetch Helper Threads With Path-Expression Based Statistical Modeling," ICS'07, Jun. 18-20, 2007, Seattle, Washington, USA, pp. 210-221.
Shayetesh, A. et al, "Improving the Performance and Power Efficiency of Shared Helpers in CMPS," Cases'06, Oct. 23-25, 2006, Seoul, Korea, pp. 345-356.
Lu, J. et al, "Dynamic Helper Threaded Prefetching on the Sun Ultrasparc CMP Processor," Proceedings of the 38TH Annual IEEE/ACM International Symposium on Microarchitecture (MICRO'05), 2005, pp. 1-12.

(Continued)

*Primary Examiner* — Robert Fennema
(74) *Attorney, Agent, or Firm* — Yudell Isidore Ng Russell PLLC

(57) ABSTRACT

A set of helper thread binaries is created from a set of main thread binaries. The helper thread monitors software or hardware ports for incoming data events. When the helper thread detects an incoming event, the helper thread asynchronously executes instructions that calculate incoming data needed by the main thread.

20 Claims, 9 Drawing Sheets

(56) References Cited

OTHER PUBLICATIONS

Ku, W. et al, "Collaborative Multithreading: An Open Scalable Processor Architecture for Embedded Multimedia Applcations," ICME 2006, pp. 25-28.

Kim, D. et al, "Design and Evaluation of Compiler Algorithms for Pre-Execution," ASPLOS X, Oct. 2002, San Jose, California, USA, pp. 159-170.

Choi, S. et al, "A General Framework for Prefetch Scheduling in Linked Data Structures and Its Application to Multi-Chain Prefetching," ACM Transactions on Computer Systems, vol. 22, No. 2, May 2004, pp. 214-280.

Kim, D. et al, "A Study of Source-Level Compiler Algorithms for Automatic Construction of Pre-Execution Code, " ACM Transactions on Computer Systems, vol. 22, No. 3, Aug. 2004, pp. 326-379.

* cited by examiner

USE OF A HELPER THREAD TO ASYNCHRONOUSLY COMPUTE INCOMING DATA

This invention was made with United States Government support under Agreement No. HR0011-07-9-0002 awarded by DARPA. The Government has certain rights in the invention.

BACKGROUND OF THE INVENTION

1. Technical Field

The present invention relates in general to computers, and in particular to computer ports. Still more particularly, the present invention relates to a system, method and computer program product for monitoring of port activity in a computer system.

2. Description of the Related Art

A computer can be viewed, in a simple perspective, as a set of hardware that manipulates data by executing instructions found in software. In some instances, the computer interacts with other computers, in order to achieve some ultimate processing goal. For example, a first computer may monitor for data or an other signal from another computer, in order to process that data or other signal. This is known as an inter-computer data exchange.

In other instances, certain software or hardware components, which are internal to a same computer, may monitor for data or an other signal from another internal software or hardware component in the same computer. This is known as an intra-computer data exchange.

In either case (intra-computer or inter-computer data exchanges), this monitoring is known as monitoring of port activity, since different software can exchange data directly by using a virtual data connection called a software port, and different hardware can exchange data via real or virtual interface plugs called hardware ports. Either type of data exchange and/or monitoring requires computations that are asynchronous to the execution of a main process running in the first computer.

SUMMARY OF THE INVENTION

A set of helper thread binaries is created from a set of main thread binaries. The set of helper thread binaries monitors software or hardware ports for incoming data events. When the set of helper thread binaries detects an incoming event, the set of helper thread binaries asynchronously executes instructions that calculate incoming data needed by the set of main thread binaries.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
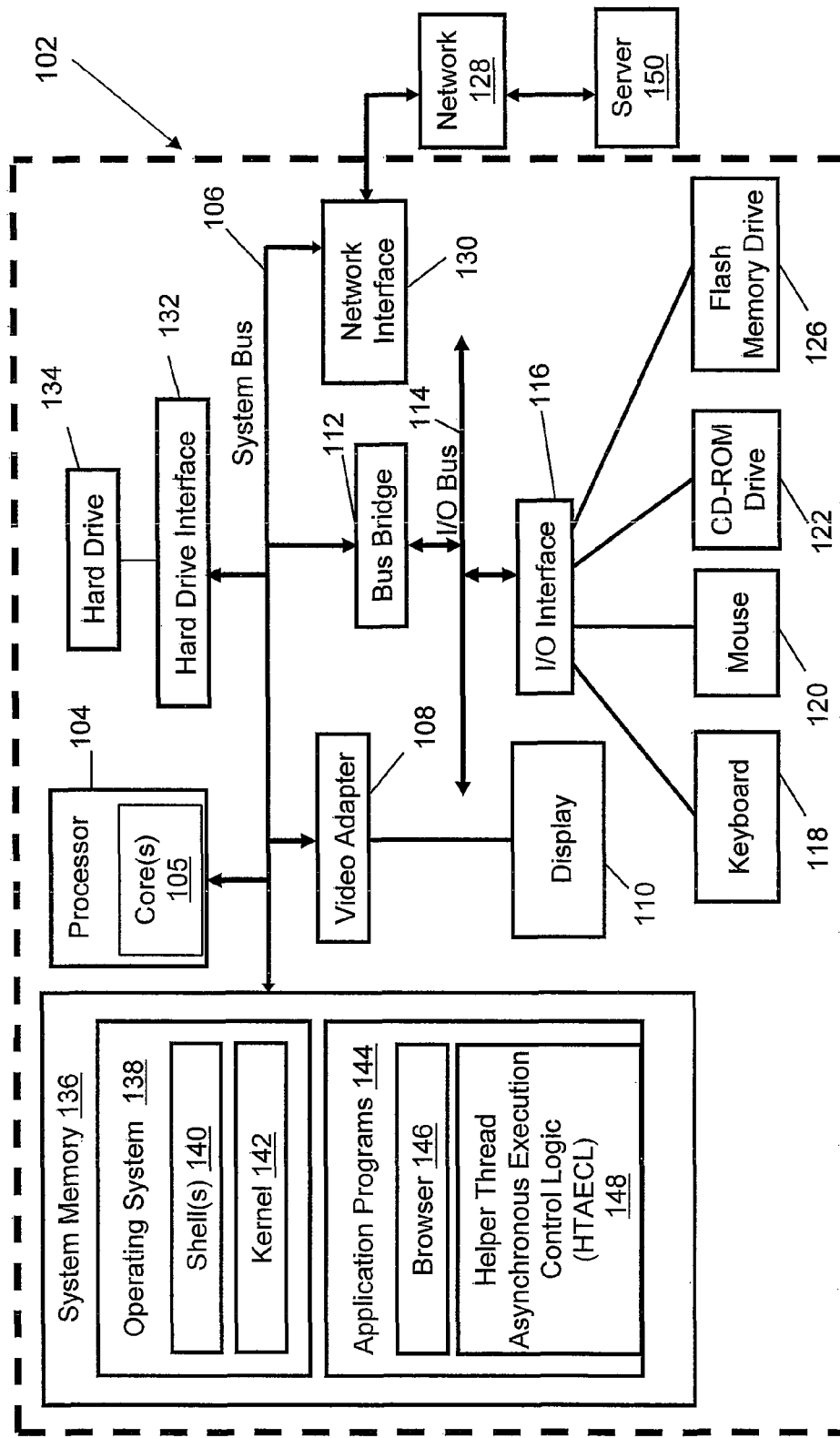
FIG. 1 is a block diagram of a data processing system in which the present invention may be implemented.

With reference flow to FIG. 1, there is depicted a block diagram of an exemplary computer 100 in which the present invention may be implemented. Computer 102 includes one or more processors 104 that are coupled to a system bus 106. Each processor 104 includes one or more processor cores 105. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which provides lower levels of functionality for OS 138 and application programs 144, including memory management, process and task management, disk management, network management, power management, and mouse and keyboard management.

Application programs 144 include a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150.

Application programs 144 in computer 102's system memory (as well as software deploying server 150's system memory) also include a Helper Thread Asynchronous Execution Control Logic (HTAECL) 148. HTAECL 148 includes code for implementing the processes described in FIGS. 2-10. In one embodiment, computer 102 is able to download HTAECL 148 from software deploying server 150, including in an "on demand" basis.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
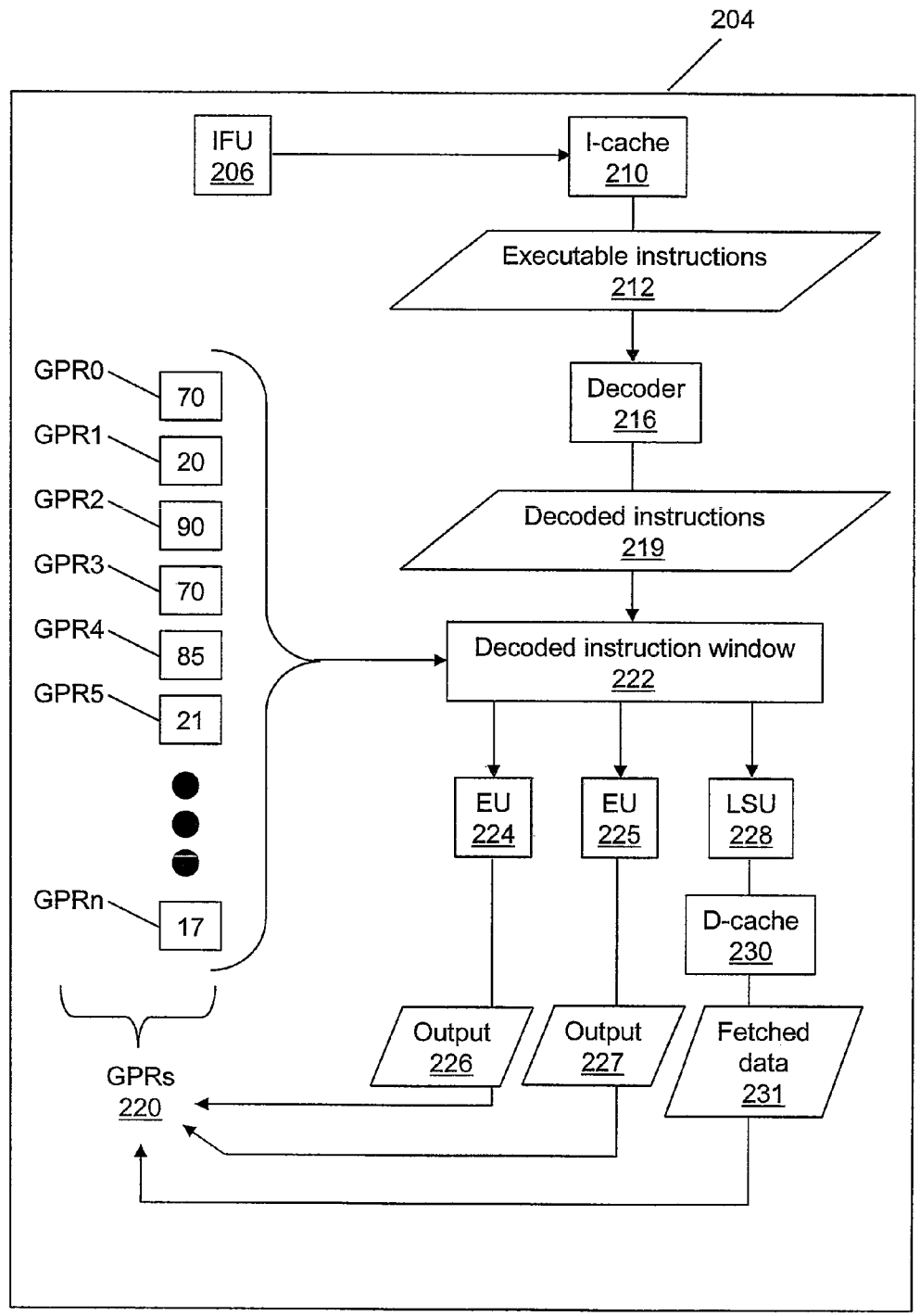
FIG. 2 depicts additional detail of a processor core used by the data processing system shown in FIG. 1.

With reference now to FIG. 2, additional detail of a processor core 204 (an example of one of the one or more processor cores 105 depicted in FIG. 1) is presented. Note that processor core 204 has other features and components beyond those depicted in FIG. 2. While such other features and components are known to those skilled in the art of computer architecture design, depicting these other features and components is not necessary to understand the operation of the present invention, and thus such features and components are omitted for the sake of clarity.

With reference now to FIG. 2, there is presented additional detail of a processor core 204 which is an example of one of the one or more processor cores 105 depicted in FIG. 1. Note that processor core 204 has other features and components beyond those depicted in FIG. 2. While such other features and components are known to those skilled in the art of computer architecture design, depicting these other features and components is not necessary to understand the operation of the present invention, and thus such features and components are omitted for the sake of clarity.

Thus, I-cache 210 sends instructions 212, which have been identified by the IFU 206 an instruction decoder 216. The instruction decoder 216 determines what actions need to occur during the execution of the instructions 212, as well as which General Purpose Register (GPR) 220 holds needed data. The GPRs 220 are depicted as GPR0 through GPRn, where "n" is an integer (e.g., n=31). In the example shown, GPR0 contains the value "70" while GPR1 contains the value "20", etc. The decoded instructions 219 and data from the GPRs 220 are buffered in a decoded instruction window 222, while they await previous operations to complete and results to become available. Once the inputs for the instruction in the decoded instruction window 222 become available they are sent to an Execution Unit (EU) 224. EU 224 may be a Fixed Point Execution Unit (FXU), a Floating Point Execution Unit (FPU), a Branch Execution Unit (BXU), or any other similar type of execution unit found in a processor core.

After executing the decoded instruction 222, the EU 224 sends the resultant output 226 into a particular GPR in the GPRs 220. The value of a GPR can also be sent to a Load/Store Unit (LSU) 228, which stores the output 226 into a data cache (D-cache) 230.

After executing the decoded instruction 222, the EU 224 sends the resultant output 226 into a particular GPR in the GPRs 220. The value of a GPR can also be sent to a Load/Store Unit (LSU) 228, which stores the output 226 into a data cache (D-cache) 230, which provides fetched data 231 to GPRs 220.

Figure 3:
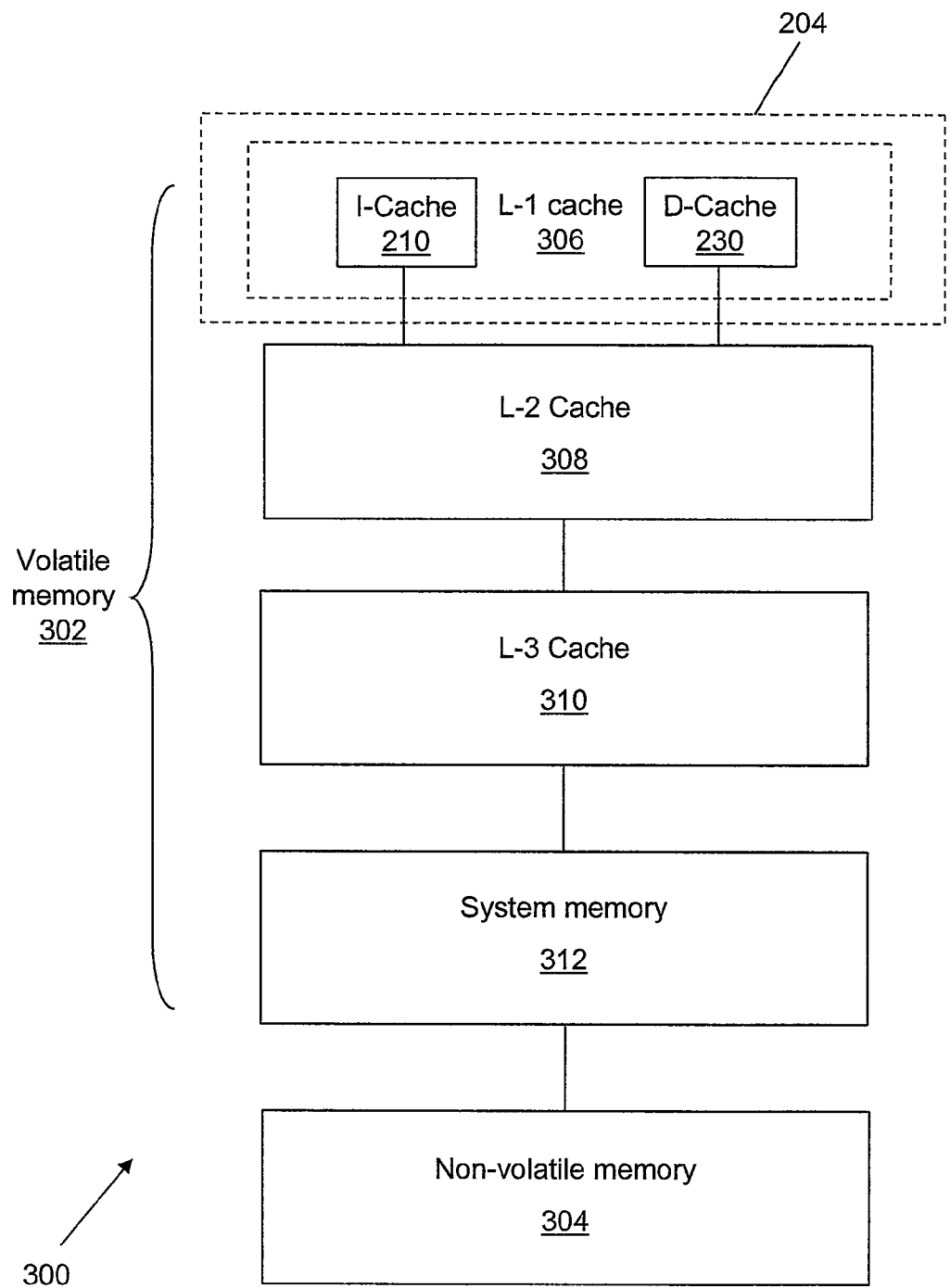
FIG. 3 illustrates a memory hierarchy used in the present invention.

With reference now to FIG. 3, a memory hierarchy 300 as utilized by the present invention is illustrated. Memory hierarchy 300 includes volatile memory 302 (memory that loses data when power is turned off) and non-volatile memory 304 (memory that is stored on a permanent medium that retains the data even after power is turned off). Within core 204 is level-one (L-1) cache 306, which includes I-cache 210 and D-cache 230 depicted in FIG. 2. Lower levels of volatile memory include level-two (L-2) cache 308; level-three (L-3) cache 310; and system memory 312. While the highest level of cache (L-1 cache 306) is the "fastest" (requiring only one or two clock cycles to retrieve data), L-1 cache 306 is also the smallest. Thus, if data is not within the L-1 cache 306, then that data must be pulled from the L-2 cache 308 (which is larger than the L-1 cache 306, but requires an order of magnitude more clock cycles to retrieve the needed data). Similarly, the L-3 cache 310 is yet larger and slower than the L-2 cache 308, the system memory 312 (e.g., Dynamic Random Access Memory—DRAM) is larger and slower than the L-3 cache 310, and the non-volatile memory 304 (e.g., a hard drive) is larger and slower than the system memory. Nonetheless, a request for data continues down the memory hierarchy 300 until the data is found. When the data is found, it is then loaded into the highest available level of memory (i.e., L-1 cache 306). Populating the L-1 cache 306 with needed data is known as "warming up" the cache.

Figure 4:
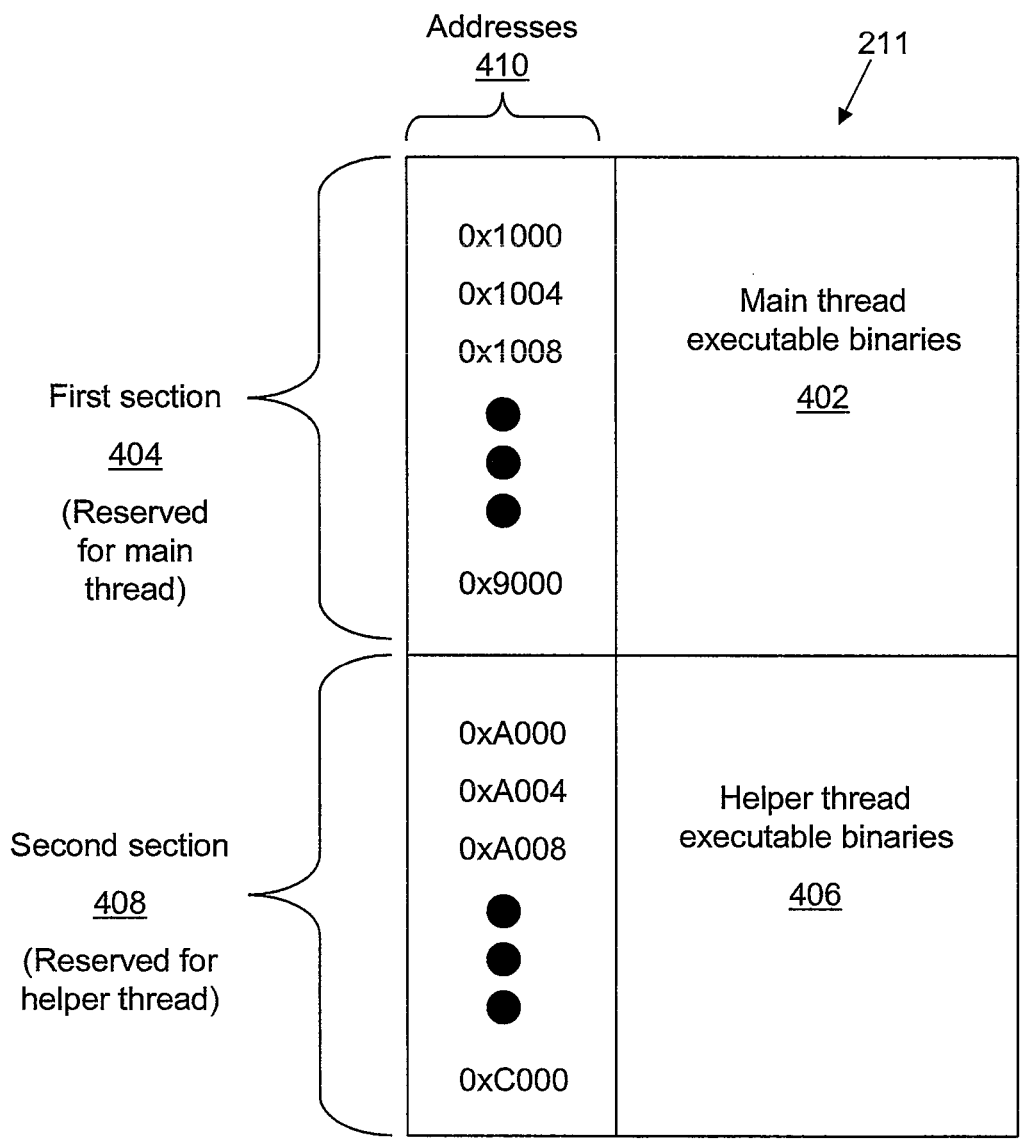
FIG. 4 depicts a set of main thread binaries and a set of helper thread binaries as they are mapped to the region of memory reserved for the application's code space.

With reference now to FIG. 4, additional detail of the application's code space 211 is presented. As discussed above, the application's executable binaries are created when the operating system uses a linker to convert object code into executable binaries. In accordance with the present invention, the operating system converts the object code into two sets of binaries: main thread executable binaries 402 and helper thread executable binaries 406, each having a range of addresses 410 that are reserved for the respective binary type. The main thread executable binaries 402 make up a complete set of instructions for a main thread of object code. The helper thread executable binaries 406 are an altered set of the main thread executable binaries.

Note that the application's code space 211 has been reserved into two sections. The first section 404 is reserved for the complete set of main thread executable binaries 402, while the second section 408 is reserved for the helper thread executable binaries 406. Note that, in one embodiment, the first section 404 and the second section 408 do not overlap, which results in a simpler implementation. Note also that the two sections may be reserved for the exclusive use of either the main thread or the helper thread. In one embodiment, the second section 408 is shorter than the first section 404. The different lengths of the respective sections may be arbitrarily preset (based on historical experience regarding how much shorter the altered helper thread is compared to the main thread), or the different lengths may be dynamically assigned according to how many operations have been removed from the main thread to create the helper thread.

Figure 5:
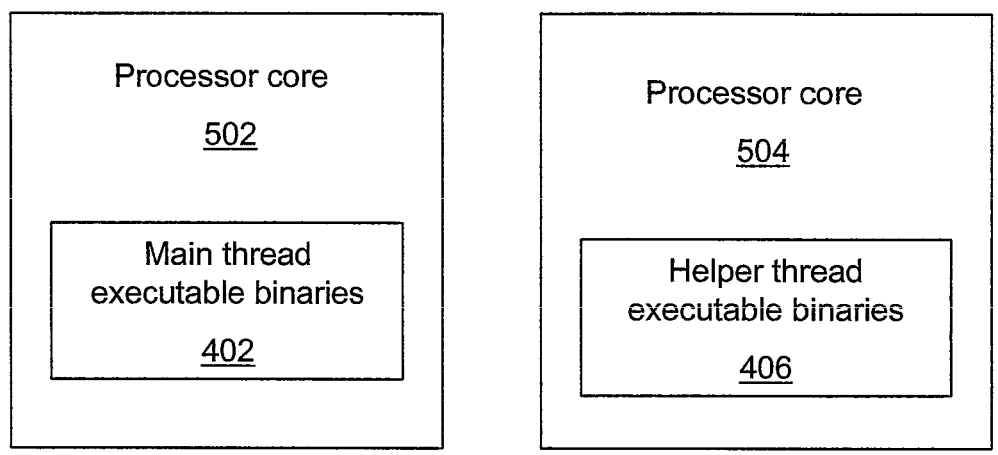
FIG. 5 illustrates two processor cores asynchronously executing the set of main thread binaries and the set of helper thread binaries.

As noted above in reference to FIG. 2, the set of main thread executable binaries 402 may be executed by a first execution unit (e.g., EU 224) while the helper thread executable binaries 406 may be executed by a second execution unit (e.g., EU 225) within a same processor core (e.g., processor core 204). Alternatively, however, the main and helper thread binaries can be executed within different processor cores 502 and 504, as depicted in FIG. 5. These processor cores 502 and 504 may be within a same computer (e.g., a multi-core computer), or different processors in a same computer (e.g., a multiprocessor computer), or different processors in different computers (e.g., a computer network of coupled single-core and/or multi-core computers).

Figure 6:
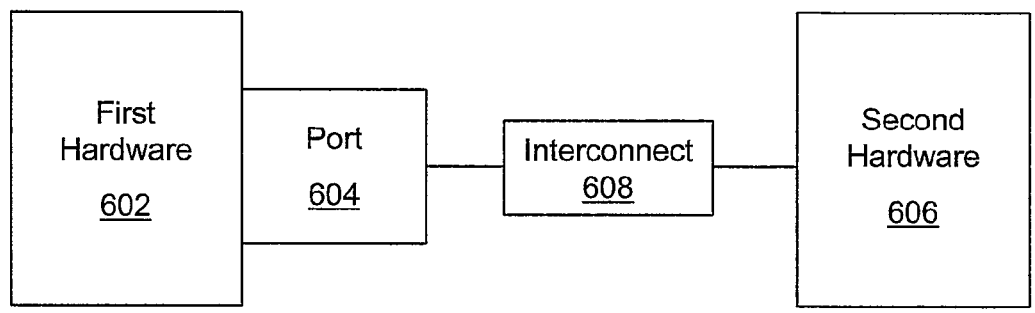
FIG. 6 depicts a first unit of hardware having a hardware port the communicates data between a second unit of hardware.

With reference now to FIG. 6, consider a first hardware 602 that has a hardware port 604. This hardware port is a hardware interface that is able to exchange data with a second hardware 606 via a hardware interconnect 608. Examples of port 604 include, but are not limited to, serial or parallel plugs into which the interconnect 608 may be plugged. In one example, first hardware 602 is a processor (such as processor 104 shown in FIG. 1) while second hardware 606 is a storage device (e.g., hard drive 134 shown in FIG. 1).

Figure 7:
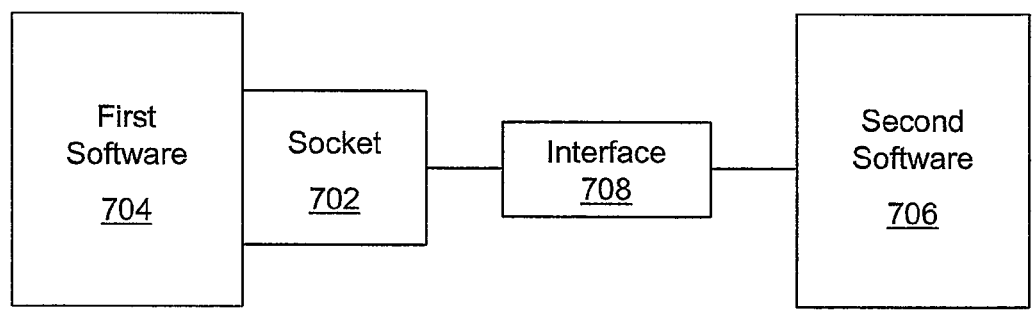
FIG. 7 illustrates a first unit of software having a software socket that communicates data between a second unit of software.

As shown in FIG. 7, another type of port is a socket 702, which is associated with a first software 704 for communicating data with a second software 706 via a software interface 708. Socket 702 is a virtual data connection that allows first software 704 and second software 706 to exchange data directly, instead of going through a file or a temporary storage location. Examples of socket 702 include, but are not limited to, Transmission Control Protocol (TCP) and User Datagram Protocol (UDP) sockets. The first software 704 and second software 706 may be applications, operating systems, or other software that exchange data back and forth.

Figure 8:
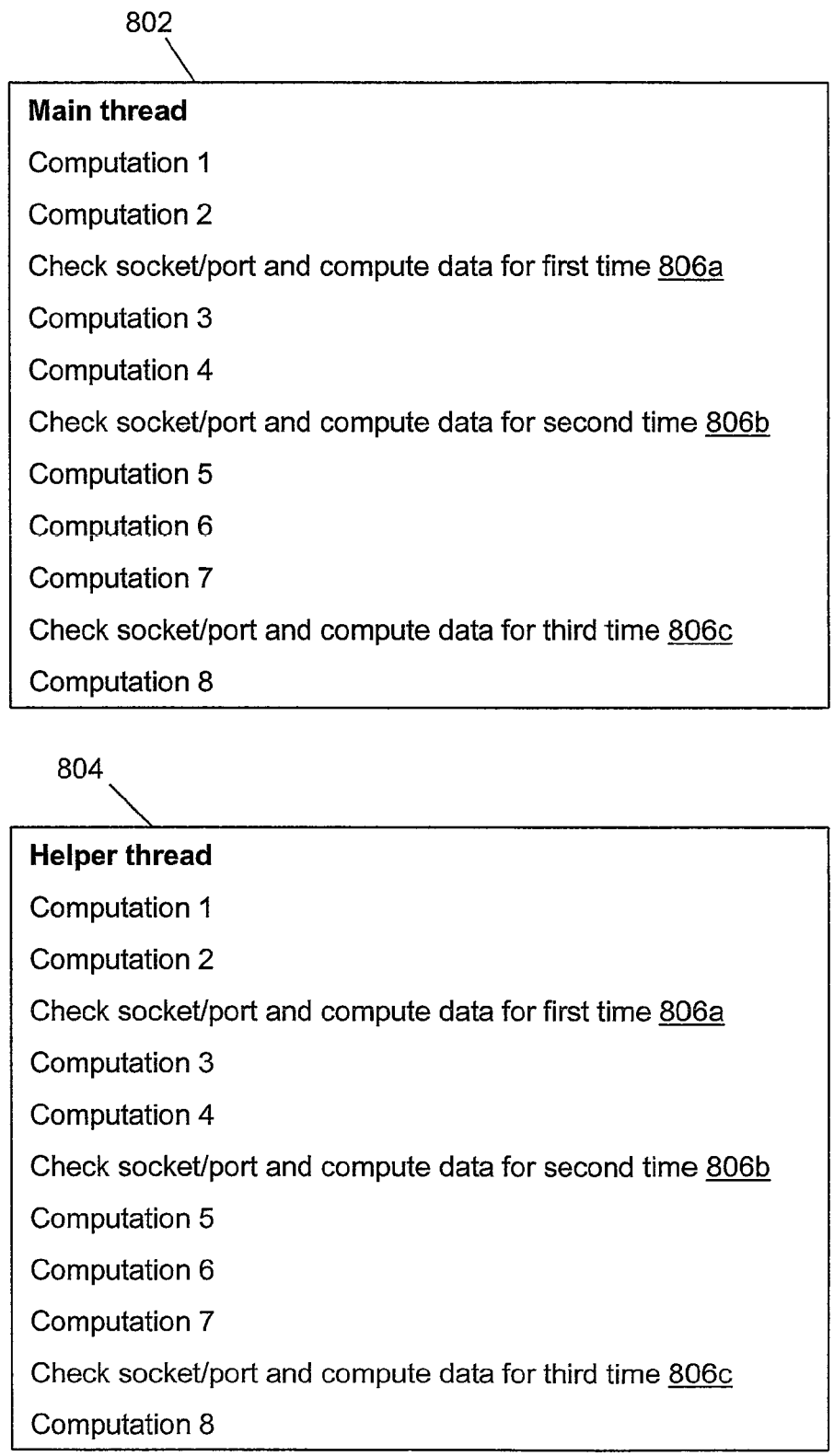
FIG. 8 depicts additional detail of the set of main thread binaries and the set of helper thread binaries, which include instructions for polling sockets/ports.
Figure 9:
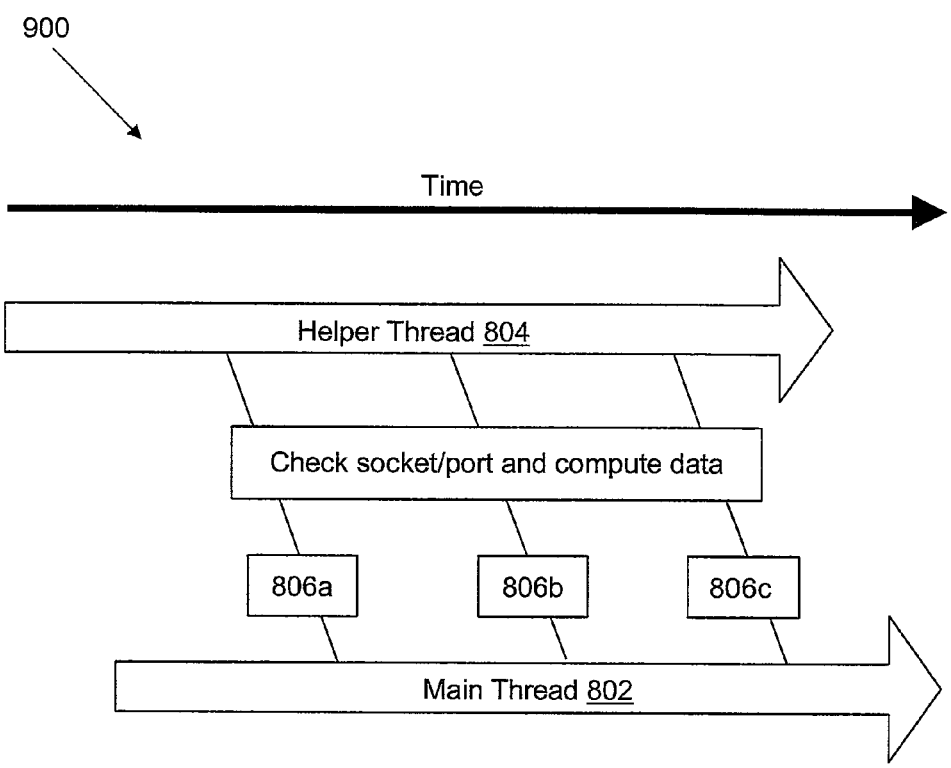
FIG. 9 illustrates the asynchronous execution of the set of main thread binaries and the set of helper thread binaries.

Referring now to FIG. 8, further detail of the main thread executable binaries 402 (shown in FIG. 4) is presented as a set of main thread binaries 802. Additional detail of helper thread executable binaries 406 (also shown above in FIG. 4) is presented as a set of helper thread binaries 804. Note that each set of binaries (8Q2 and 804) include instructions 806a-c for polling a socket/port. By executing the set of helper thread binaries 804 before initiating execution of the set of main thread binaries 802 (as illustrated by the timeline 900 shown in FIG. 9), the helper thread 804 is able to perform asynchronous execution of instructions 806a-c before the data resulting from such execution is needed by the main thread 802. That is, assume that the helper thread 804 runs the instruction sequence represented by instruction 806a, detects that an event has occurred at the socket/port (indicating that data is now available to that socket/port), and gathers that data (e.g., by opening a port, retrieving data from a specified location, saving it to a buffer in main memory, etc.). By running "ahead" of the main thread 802, the helper thread 804 is able to pre-fetch the data on the port for use by the main thread 802. In another embodiment, the set of helper thread binaries 804 is made up of only instructions 806a-c, and thus will be able to pre-fetch the port data, even if the set of main thread binaries and the set of helper thread binaries begin executing at the same time, since the helper thread will not be bogged down by executing Computations 1-8 (computations that directly lead to final outcome by the execution of the main thread). In yet another embodiment, the set of helper thread binaries 804 includes Computations 1-8, but the Operating System (OS) that is controlling execution of the helper thread 804 includes logic for skipping over Computations 1-8.

Figure 10:
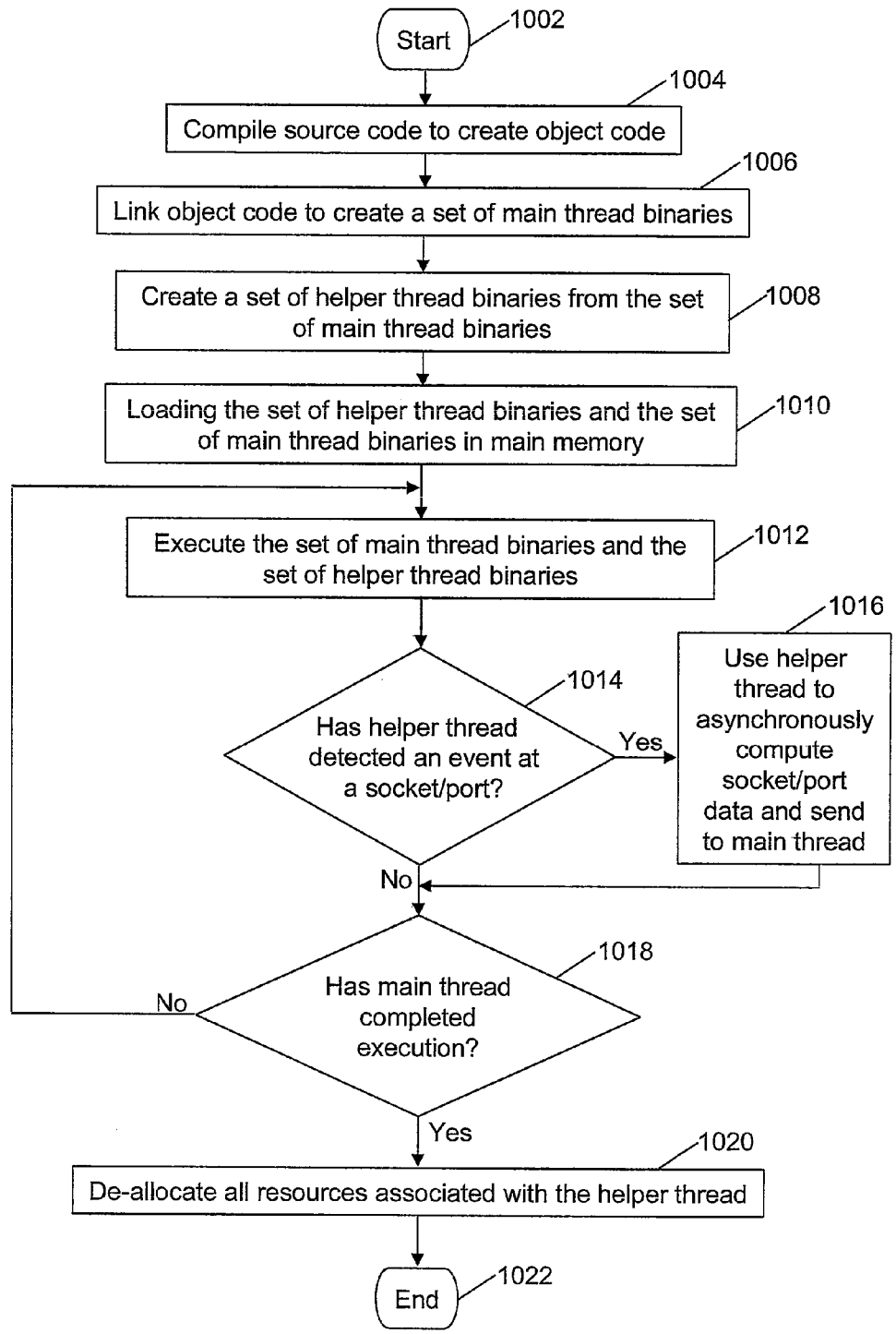
FIG. 10 is a high-level flow chart describing exemplary steps to utilize the set of helper threads to poll ports.

With reference now to FIG. 10, a high-level flow chart of exemplary steps taken to utilize a helper thread to perform asynchronous execution of instructions for polling ports and gathering data from the polled ports. After initiator block 1002, source code is compiled to create object code (block 1004), which is then run through a linker to create a set of main thread binaries (block 1006). A set of helper thread binaries, which may be an exact copy or an abridged copy of the set of main thread binaries, is then created by the OS (block 1008). The set of main thread binaries and the set of helper thread binaries are then loaded in main memory, for retrieval by an IFU (e.g., 206 shown in FIG. 2) and use in execution units in one or more processor cores (block 1010). The set of main thread binaries is executed (block 1012), either contemporaneous to or after the set of helper thread binaries as described above. Note that the set of main thread binaries and the set of helper thread binaries may execute within a same processor core, within different processor cores, and/or within different processors. If the set of helper thread binaries is executed within a same processor core using one or more execution units that are shared with the set of main thread binaries, then the set of helper thread binaries should only execute during periods in which the set of main thread binaries is in a wait state (e.g., an idle state during which time data is being retrieved from a remote location, a stall state, etc.).

The helper thread may detect an event at a port (either a hardware port or a software socket) indicating that data is becoming available to that port (query block 1014). If so, then the helper thread executes instructions that retrieve that data and make it available to the main thread (block 1016). This data may be made available by populating buffers in main memory being used by the main thread.

Once the main thread has completed execution (query block 1018), all system resources associated with the helper thread are de-allocated (block 1020). The process ends at terminator block 1022.

Although aspects of the present invention have been described with respect to a computer processor and software, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to preferred embodiments thereof, it will be apparent that modifications and variations are possible without departing from the scope of the invention defined in the appended claims.

What is claimed is:

1. A method of utilizing a helper thread to perform an asynchronous computation for retrieving data at a port, the method comprising:
creating a set of helper thread binaries along with a set of main thread binaries within an application code space by linking object code generated from compiled source code of an application, wherein the set of helper thread binaries includes instructions for polling one or more of software sockets and hardware ports for an incoming data event that indicates that data is now available at a particular port at which the incoming data event is detected;
executing the set of helper thread binaries;
executing the set of main thread binaries;
in response to a helper thread of the set of helper thread binaries detecting an incoming data event at a port during polling of the one or more software sockets and hardware ports, asynchronously executing instructions in the set of helper thread binaries that compute incoming data needed by the set of main thread binaries and retrieve from the port the needed data that will be necessary to continue execution of a main thread represented by the main thread binaries; and
providing the needed data to the main thread.

2. The method of claim 1, wherein the port is one of a software socket that allows a first software and a second software to exchange data directly and a hardware interface between two hardware units.

3. The method of claim 1, wherein the incoming data event is a notification of data becoming available to the port and providing the needed data to the main thread comprises populating buffers in memory being used by the main thread with the needed data retrieved from the port.

4. The method of claim 1, further comprising:
initiating execution of the helper thread before initiating execution of the main thread in order to have the helper thread obtain the needed data before the needed data is needed by the main thread.

5. The method of claim 1, further comprising:
skipping any computational instruction from the set of helper thread binaries that is not designed to perform one of: polling the port for the incoming data event, retrieving the needed data from the port to obtain the needed data before the needed data is needed by the main thread, and making the needed data available to the main thread, wherein the computational instructions are instructions within the main thread binaries which provide computations that directly lead to a final outcome by the execution of the main thread on an execution unit within a processor core, and wherein the set of helper thread binaries comprises both computational instructions and a different set of instructions to complete the polling and the compute processes and the retrieving and the making processes.

6. The method of claim 1, further comprising:
deleting any computational instruction from the set of helper thread binaries that is not designed to perform one of: polling the port for the incoming data event, retrieving the needed data from the port in order to obtain the needed data before the needed data is needed by the main thread, and making the needed data available to the main thread, wherein the computational instructions are instructions within the main thread binaries which provide computations that directly lead to a final outcome by the execution of the main thread on an execution unit within a processor core, and wherein the set of helper thread binaries initially comprises both computational instructions and a different set of instructions to complete the polling and the computer processes and the retrieving and the making processes.

7. The method of claim 1, wherein the set of main thread binaries and the set of helper thread binaries execute in different processor cores.

8. The method of claim 1, wherein the set of main thread binaries and the set of helper thread binaries execute in a same processor core, and wherein the method further comprises executing the set of helper thread binaries only when execution of the main thread is in a wait state.

9. A system comprising:
a processor;
a data bus coupled to the processor;
a memory coupled to the processor via the data bus; and
a computer-usable medium embodying computer program code, the computer program code comprising instructions executable by the processor and which configures the system to:
create a set of helper thread binaries along with a set of main thread binaries within an application code space by linking object code generated from compiled source code of an application, wherein the set of helper thread binaries includes instructions for polling one or more of software sockets and hardware ports for an incoming data event that indicates that data is now available at a particular port at which the incoming data event is detected;
execute the set of helper thread binaries;
execute the set of main thread binaries;
in response to a helper thread of the set of helper thread binaries detecting an incoming data event at a port during polling of the one or more software sockets and hardware ports, asynchronously execute instructions from within the set of helper thread binaries that computes incoming data needed by the set of main thread binaries and retrieve from the port the needed data that will be necessary to continue execution of a main thread represented by the main thread binaries; and
provide the needed data to the main thread.

10. The system of claim 9, wherein:
the port is one of a software socket that allows a first software and a second software to exchange data directly and a hardware interface between two hardware units within the system;
the event is a notification of data becoming available to the port; and
providing the needed data to the main thread comprises populating buffers in main memory being used by the main thread with the needed data retrieved from the port.

11. The system of claim 9, wherein the computer program code further comprises instructions executable by the processor and configures the system to:
initiate execution of the helper thread before initiating execution of the main thread in order to have the helper thread obtain the needed data before the needed data is needed by the main thread; and
perform one of skipping and deleting any computational instruction from the set of helper thread binaries that is not designed to perform one of polling the port for the incoming data event, retrieving the needed data from the port to obtain the needed data before the needed data is needed by the main thread, and making the needed data available to the main thread, wherein the computational instruction is an instruction within the main thread binaries which provides computations that directly lead to a final outcome by the execution of the main thread on an execution unit within a processor core, and wherein the set of helper thread binaries initially comprises both computational instructions and a different set of instructions to complete the polling and the compute processes and the retrieving and the making processes.

12. The system of claim 9, wherein:

the set of main thread binaries and the set of helper thread binaries execute in one of a same processor core and different processor cores; and if the set of main thread binaries and the set of helper thread binaries are executing in a same processor core, the set of helper thread binaries executes only when execution of the main thread is in a wait state.

13. A computer-readable storage medium having a plurality of instructions processable by a machine stored thereon, wherein said plurality of instructions, when processed by said machine, causes said machine to perform processes comprising:

creating a set of helper thread binaries along with a set of main thread binaries within an application code space by linking object code generated from compiled source code of an application, wherein the set of helper thread binaries includes instructions for polling one or more of software sockets and hardware ports for an incoming data event that indicates that data is now available at a particular port at which the incoming data event is detected;

executing the set of helper thread binaries;

executing the set of main thread binaries;

in response to a helper thread of the set of helper thread binaries detecting an incoming data event at a port during polling of the one or more software sockets and hardware ports, asynchronously executing instructions in the set of helper thread binaries that calculate incoming data needed by the set of main thread binaries and retrieve from the port the needed data that will be necessary to continue execution of a main thread represented by the main thread binaries; and providing the needed data to the main thread;

wherein the storage medium is one of a writeable storage medium or non-writable storage medium.

14. The computer-readable storage medium of claim 13, wherein the port is one of a software socket that allows a first software and a second software to exchange data directly and a hardware interface between two hardware units, and the event is a notification of data becoming available to the port.

15. The computer-readable storage medium of claim 13, wherein the event is a notification of data becoming available to the port and providing the needed data to the main thread comprises populating buffers in main memory being used by the main thread with the needed data retrieved from the port.

16. The computer-readable storage medium of claim 13, wherein the instructions further causes the machine to perform processes comprising:

initiating execution of the set of helper thread binaries before initiating execution of the set of main thread binaries in order to have the set of helper thread binaries obtain the needed data before the needed data is needed by the main thread.

17. The computer-readable storage medium of claim 13, wherein the instructions further causes the machine to perform processes comprising:

skipping any computational instruction from the set of helper thread binaries that is not designed to perform one of: polling the port for the incoming data event, retrieving the needed data from the port to obtain the needed data before the needed data is needed by the main thread, and making the needed data available to the main thread, wherein the computational instructions are instructions within the main thread binaries which provide computations that directly lead to a final outcome by the execution of the main thread on an execution unit within a processor core, and wherein the set of helper thread binaries comprises both computational instructions and a different set of instructions to complete the polling and the compute processes and the retrieving and the making processes.

18. The computer-readable storage medium of claim 13, wherein the instructions further causes the machine to perform processes comprising:

deleting any computational instruction from the set of helper thread binaries that is not designed to perform one of: polling the port for the incoming data event, retrieving the needed data from the port in order to obtain the needed data before the needed data is needed by the main thread, and making the needed data available to the main thread, wherein the computational instructions are instructions within the main thread binaries which provide computations that directly lead to a final outcome by the execution of the main thread on an execution unit within a processor core, and wherein the set of helper thread binaries initially comprises both computational instructions and a different set of instructions to complete the polling and compute processes and the retrieving and the making processes.

19. The computer-readable storage medium of claim 13, wherein the set of main thread binaries and the set of helper thread binaries execute in different processor cores.

20. The computer-readable storage medium of claim 13, wherein the set of main thread binaries and the set of helper thread binaries execute in a same processor core, and wherein the instructions further cause the machine to perform processes comprising executing the set of helper thread binaries only when execution of the set of main thread binaries is in a wait state.

* * * * *